US008511339B2

(12) United States Patent
Kim et al.

(10) Patent No.: US 8,511,339 B2
(45) Date of Patent: Aug. 20, 2013

(54) FUEL PRESSURE CONTROLLER

(75) Inventors: KyungHwan Kim, Yeongi-gun (KR);
Se-Dong Baek, Daejeon (KR);
DongHeon Mo, Yeongi-gun (KR);
Jeongsik Kim, Daejeon (KR)

(73) Assignee: Coavis (KR)

( * ) Notice: Subject to any disclaimer, the term of this patent is extended or adjusted under 35 U.S.C. 154(b) by 223 days.

(21) Appl. No.: 13/167,953

(22) Filed: Jun. 24, 2011

(65) Prior Publication Data

US 2011/0315242 A1 Dec. 29, 2011

(30) Foreign Application Priority Data

Jun. 24, 2010 (KR) .................. 10-2010-0059902

(51) Int. Cl.
*F16K 15/04* (2006.01)
(52) U.S. Cl.
USPC .......................... 137/539; 137/535; 251/337
(58) Field of Classification Search
USPC ................ 137/539, 539.5, 535; 251/337
See application file for complete search history.

(56) References Cited

U.S. PATENT DOCUMENTS

| 2,249,971 | A | * | 7/1941 | Mecorney | 137/537 |
| 2,676,608 | A | * | 4/1954 | Svenson | 137/539 |
| 2,935,995 | A | * | 5/1960 | Rucker | 137/539 |
| 2,947,529 | A | * | 8/1960 | Schwartz et al. | 267/161 |
| 3,324,673 | A | * | 6/1967 | Lindahl et al. | 137/539 |
| 3,536,315 | A | * | 10/1970 | Jenkin | 267/161 |
| 4,045,009 | A | * | 8/1977 | Pees | 267/139 |
| 6,293,259 | B1 | * | 9/2001 | Kilgore et al. | 137/539 |
| 7,059,344 | B2 | * | 6/2006 | Shibamoto et al. | 137/512.1 |
| 7,124,739 | B2 | * | 10/2006 | Endoh et al. | 123/457 |
| 7,287,546 | B2 | * | 10/2007 | Konishi | 137/539 |
| 2006/0108007 | A1 | * | 5/2006 | Etheridge et al. | 137/539 |
| 2011/0186152 | A1 | * | 8/2011 | Herrera | 137/535 |

* cited by examiner

*Primary Examiner* — John Rivell
(74) *Attorney, Agent, or Firm* — Cantor Colburn LLP

(57) ABSTRACT

A fuel pressure controller used in a fuel supply device of an automobile has an open-close ball insertion groove formed to be protruding from a side of a valve pressing member. The valve pressing member has a predetermined open area in a circumferential direction and in a radial direction to prevent separation of an open-close ball even at the time of an operation, such that pressure may be accurately controlled and noise may be reduced.

9 Claims, 9 Drawing Sheets

FUEL PRESSURE CONTROLLER

CROSS-REFERENCE TO RELATED APPLICATIONS

This application claims priority under 35 U.S.C. §119 to Korean Patent Application No. 10-2010-0059902, filed on Jun. 24, 2010, in the Korean Intellectual Property Office, the disclosure of which is incorporated herein by reference in its entirety.

TECHNICAL FIELD

The following disclosure relates to a fuel pressure controller used in a fuel supply device of an automobile, and more particularly, to a fuel pressure controller in which an open-close ball insertion groove is formed to be protruded in one side direction within a valve pressing member formed to be opened by a predetermined area in a circumferential direction and in a radial direction to prevent separation of an open-close ball even at the time of an operation of a valve of the fuel pressure controller, such that pressure may be accurately controlled and noise may be reduced.

BACKGROUND

A fuel pressure controller including a valve is used in a fuel supply device of an automobile in order to maintain constant pressure and smoothly supply fuel.

Pressure at the time of injection of the fuel from a fuel tank by a fuel pump is controlled by the fuel pressure controller, such that the fuel moves to a fuel injection device.

Fuel remaining after being injected by the fuel injection device returns to an inner portion of the fuel tank or a reservoir through the fuel pressure controller according to a form of the fuel supply device.

As shown in FIG. 1, the fuel pressure controller 1 according to the related art is mainly configured to include a valve 10, a valve sheet 11, a ball 20, a housing 30, a diaphragm 40, a spring 50, and the like.

The fuel pressure controller 1 requires a considerable number of components and has high material and production costs due to a difficulty of an assembly process.

As shown in FIG. 2, in another fuel pressure controller 1' according to the related art, a valve pressing member 30' pressing an open-close ball 20' seated on a valve sheet 11' together with a flow passage formed in a valve 10' is used.

At low fuel pressure, the open-close ball 20' is pressed to a close position in order to prevent the fuel from passing through the fuel pressure controller 1'.

As fuel pressure increases, pressure for the open-close ball 20 seated on the valve sheet 11 overcomes pressing force of the valve pressing member 30' and the open-close ball 20' moves to thereby allow the fuel to flow through the valve sheet 11', such that the fuel pressure is controlled.

There is no accurate seat surface at a portion at which a central part of the valve pressing member 30' and the open-close ball 20' are in contact with each other, such that the open-close ball 20' may be separated at the time of an assembly process.

In addition, when the open-close ball 20' is assembled out of center, noise may be generated and the open-close ball 20' moves nonlinearly, such that control performance of the fuel pressure is deteriorated.

Therefore, there is a need to provide a fuel pressure controller for overcoming disadvantages of the fuel pressure controller 1' according to the related art.

SUMMARY

An embodiment of the present invention is directed to providing a fuel pressure controller in which an open-close ball insertion groove on which an open-close ball may be seated is formed in a valve pressing member included in the fuel pressure controller to prevent separation of an open-close ball at the time of an operation of the fuel pressure controller, such that pressure may be accurately controlled and noise may be reduced.

Further, an embodiment of the present invention is to provide a fuel pressure controller of which the number of components is reduced, such that a cost may be reduced and an assembly process may be simplified.

Furthermore, an embodiment of the present invention is to provide a fuel pressure controller in which opening parts having the same width are formed in a valve pressing member in a circumferential direction and in a radial direction to thereby generate displacement by which an open-close ball moves linearly according to applied pressure of fuel and control the movement displacement of the open-close ball to be smaller than that of the open-close ball in the valve pressing member according to the related art, such that pressure may be finely controlled.

In a general aspect, a fuel pressure controller 1000 of a fuel supply device includes: a valve 100 having a hollow part 130 formed therein and inlet and outlet ports 110 and 120 provided at both ends of the hollow part 130 to thereby control a flow of fuel, the hollow part 130 having the fuel flowing therethrough; open-close balls 200 and 201 opening or closing the outlet port 120; a disk shaped valve pressing member 300 including first opening parts 310 formed to penetrate through upper and lower surfaces thereof so that a predetermined area thereof is opened in a circumferential direction and second opening parts 320 formed to penetrate through the upper and lower surfaces thereof so that a predetermined area thereof is opened in a radial direction and pressing the open-close balls 200 and 201 toward the outlet port 120; and a housing 400 receiving the valve 100 and the valve pressing member 300 therein.

The valve pressing member 300 may include an open-close ball insertion part 330 formed to be protruded in one side direction thereof, wherein the open-close ball insertion part 330 includes the open-close ball 200 forcedly inserted thereinto and fixed thereto.

The open-close ball 200 may have one side formed to have the same shape as that of a bottom surface of the open-close ball insertion part 330 so that it is seated on the bottom surface thereof while contacting the bottom surface thereof.

The valve pressing member 300 may include a spherical body shaped open-close ball 201 formed integrally therewith at one side thereof to thereby open or close the outlet port 120.

A plurality of first opening parts 310 may be formed to be spaced apart from each other by predetermined intervals in the circumferential direction, and a plurality of second opening parts 320 may be formed to be spaced apart from each other by predetermined intervals in the radial direction.

The first opening parts 310 of the valve pressing member 300 may be formed to be opened at the same width in the circumferential direction, the second opening parts 320 thereof may be formed to be opened at the same width in the radial direction.

The first and second opening parts 310 and 320 of the valve pressing member 300 may be formed so that predetermined areas thereof are in communication with each other.

The outlet port 120 may include an open-close ball seat surface 140 formed at an end portion thereof, wherein the open-close ball seat surface 140 contacts the open-close ball 200 and 201 and is formed to be inclined inwardly so that the open-close balls 200 and 201 are seated on the end portion of the outlet port 120 while sealing the outlet port 120 in order to block a flow of the fuel to the outlet port 120.

The housing 400 may include: a valve housing part 410 enclosing an outer circumferential surface of the valve 100 and fixing the valve 100; and a valve pressing member housing part 420 supporting a lower surface of the valve pressing member 300 so as to fix the valve pressing member 300 while receiving the valve pressing member 300 therein and enclosing an outer circumferential surface of the valve pressing member 300.

The housing 400 may be welded or clamped and be adhered to the valve pressing member 300 and the valve 100 to thereby be closely fixed thereto.

The valve 100 may include a sealing member 600 formed on a lower outer circumferential surface thereof.

The inlet port 110 may further include a fuel filter 500 formed in order to filter the fuel flowing through the valve 100.

DETAILED DESCRIPTION OF MAIN ELEMENTS

| | |
|---|---|
| 1000: FUEL PRESSURE CONTROLLER | 100: VALVE |
| 110: INLET PORT | 120: OUTLET PORT |
| 130: HOLLOW PART | |
| 140: OPEN-CLOSE BALL SEAT SURFACE | |
| 200, 201: OPEN-CLOSE BALL | |
| 300: VALVE PRESSING MEMBER | |
| 310: FIRST OPENING PART | |
| 320: SECOND OPENING PART | |
| 330: OPEN-CLOSE BALL INSERTION PART | 400: HOUSING |
| 410: VALVE HOUSING PART | |
| 420: VALVE PRESSING MEMBER HOUSING PART | |
| 500: FUEL FILTER | 600: SEALING MEMBER |

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

The present invention relates to a fuel pressure controller 1000 used in an engine of an automobile, and more particularly, to a fuel pressure controller 1000 in which a cross sectional area of a channel varies according to a movement distance of open-close balls 200 and 201 within a valve 100 to thereby improve pressure control characteristics.

Figure 1:
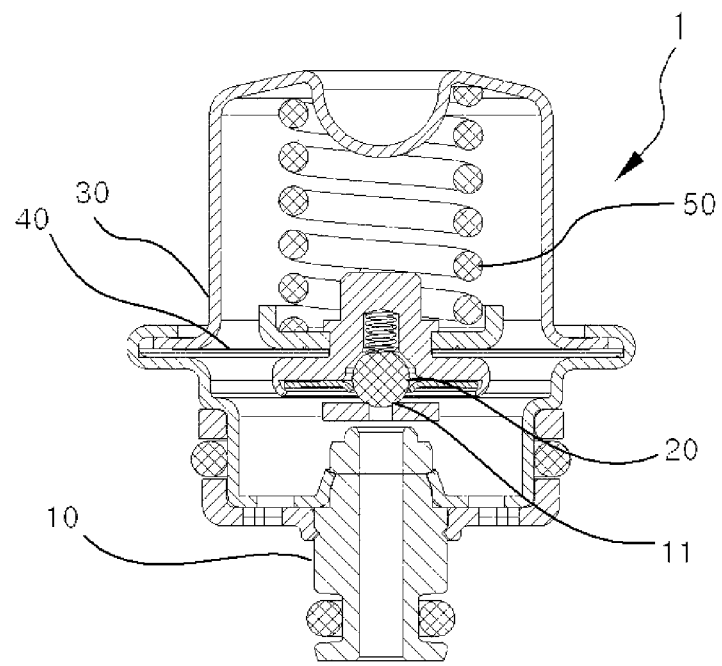
FIG. 1 is a cross-sectional view showing the fuel pressure controller according to the related art.
Figure 2:
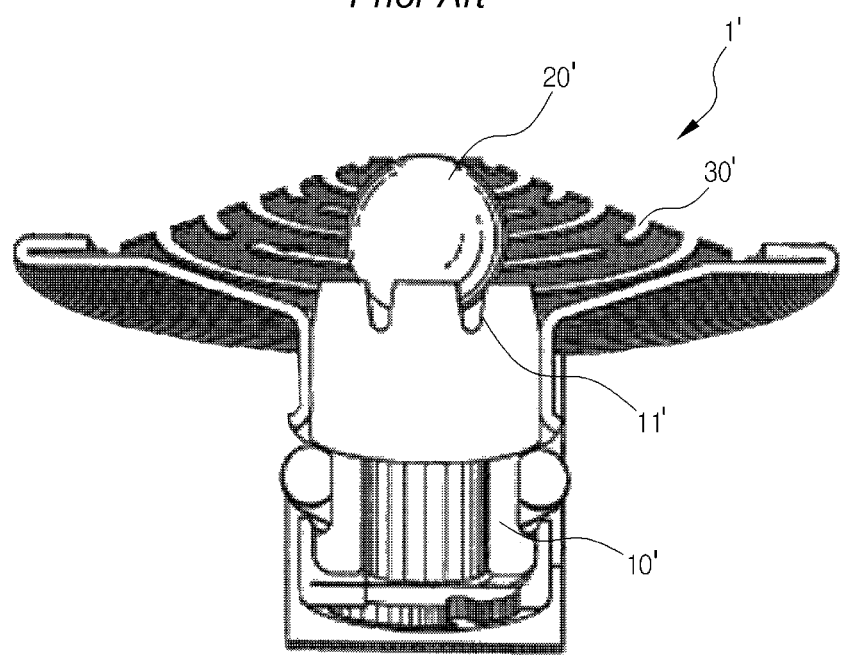
FIG. 2 is a cross-sectional view showing another fuel pressure controller according to the related art.
Figure 3:
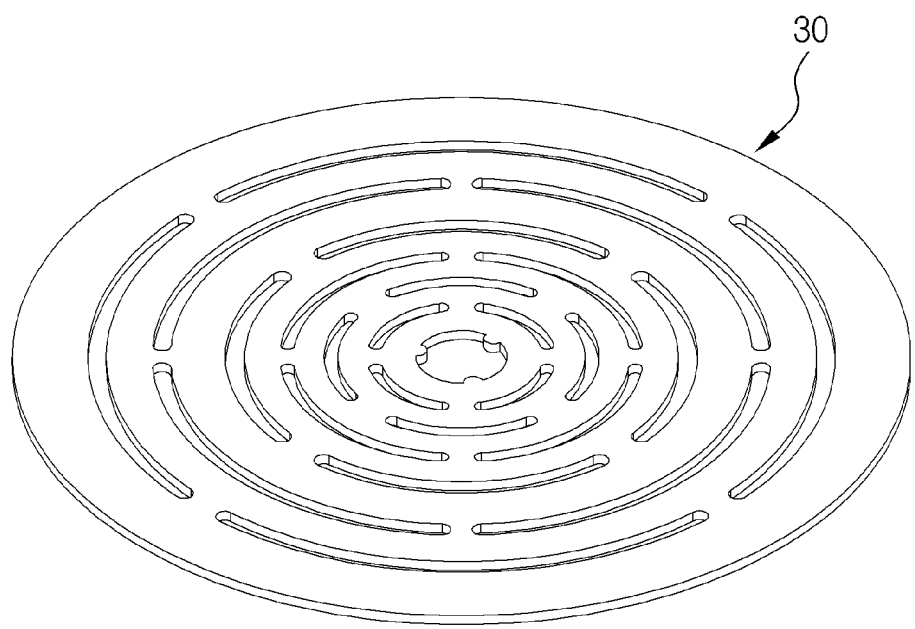
FIG. 3 is a perspective view showing the valve pressing member according to the related art.
Figure 4:
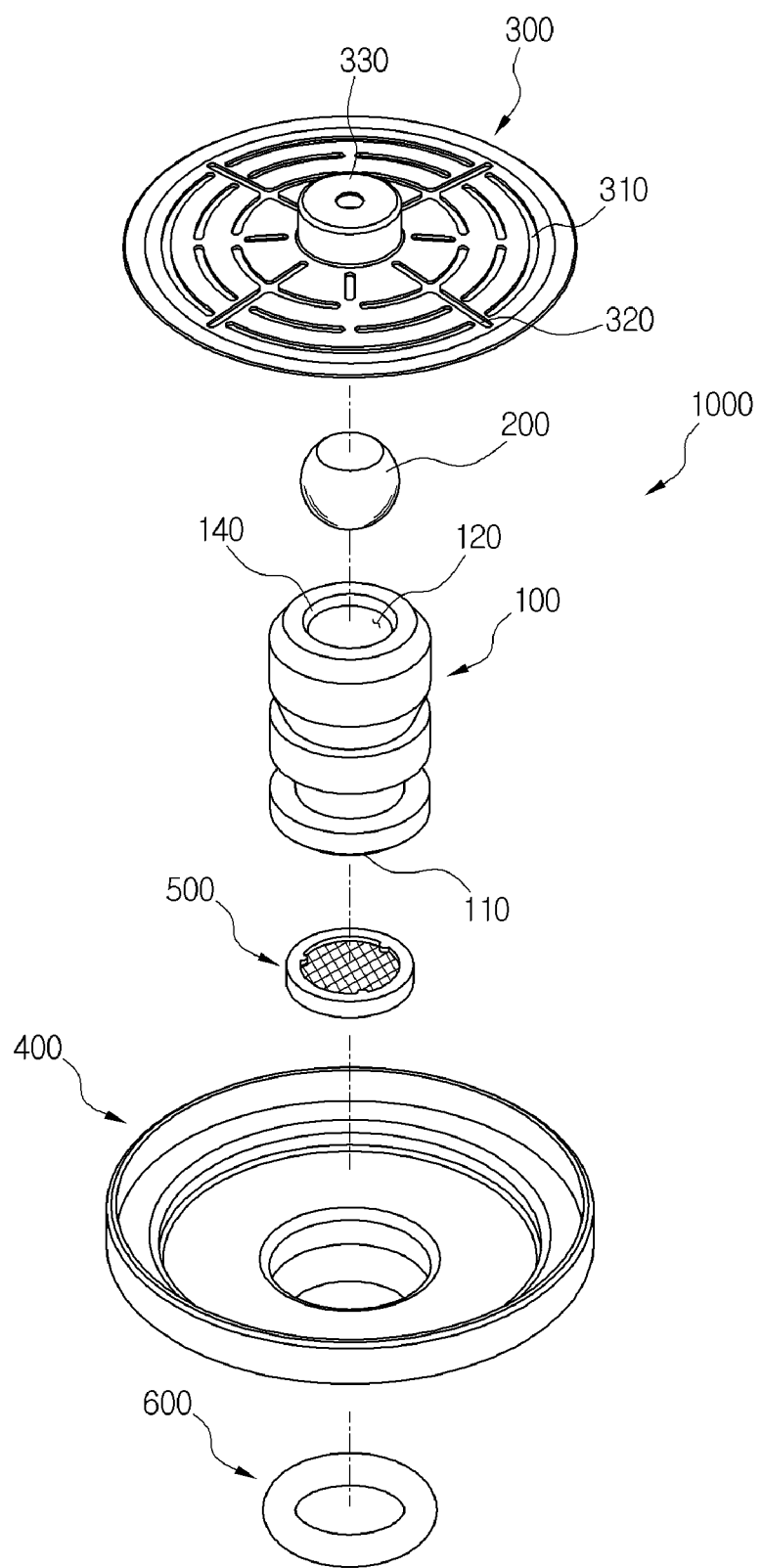
FIG. 4 is an exploded perspective view showing a fuel pressure controller according to the present invention.
Figure 5:
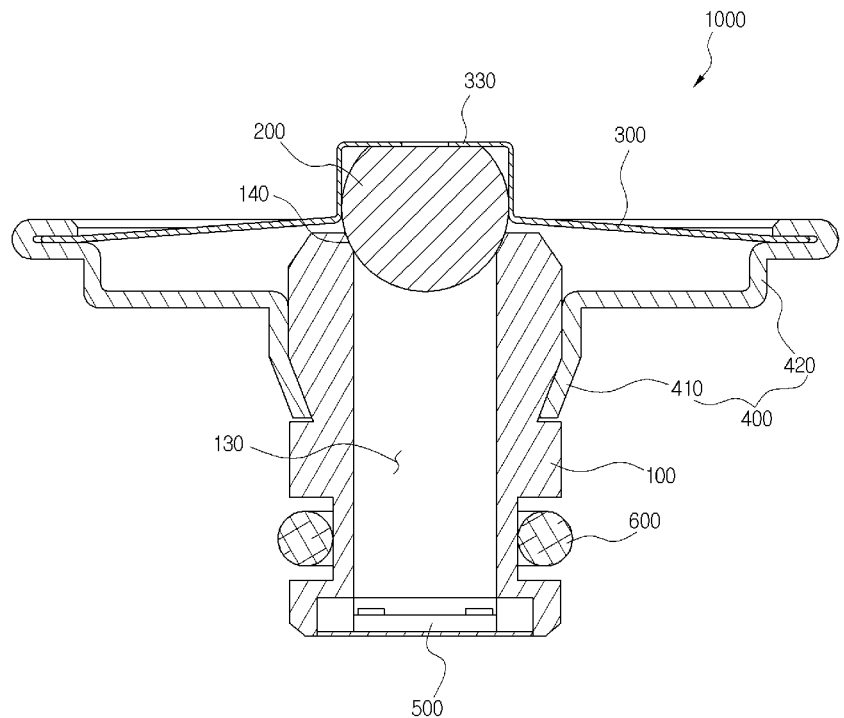
FIG. 5 is a cross-sectional view showing a fuel pressure controller according to the present invention.
Figure 6:
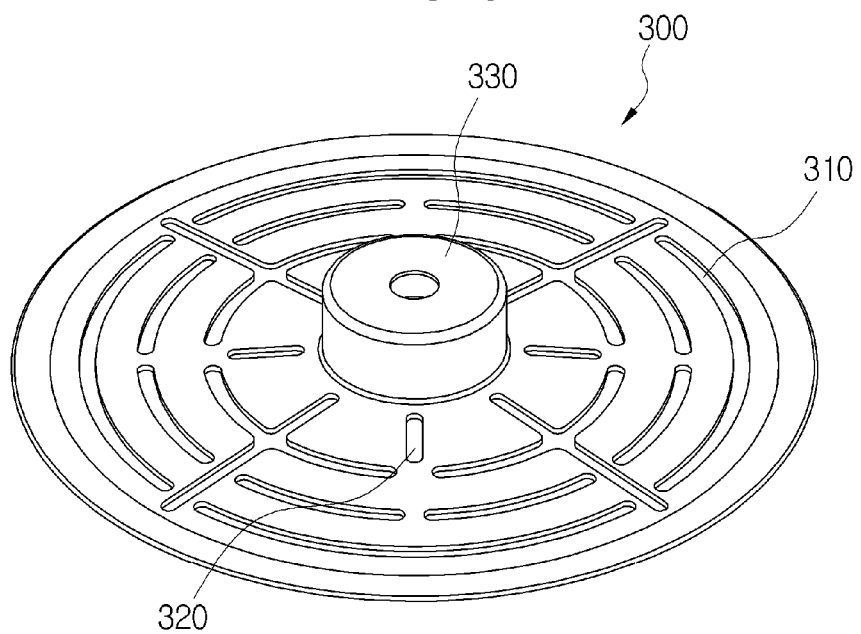
FIG. 6 is a perspective view showing the valve pressing member according to the present invention.
Figure 7:
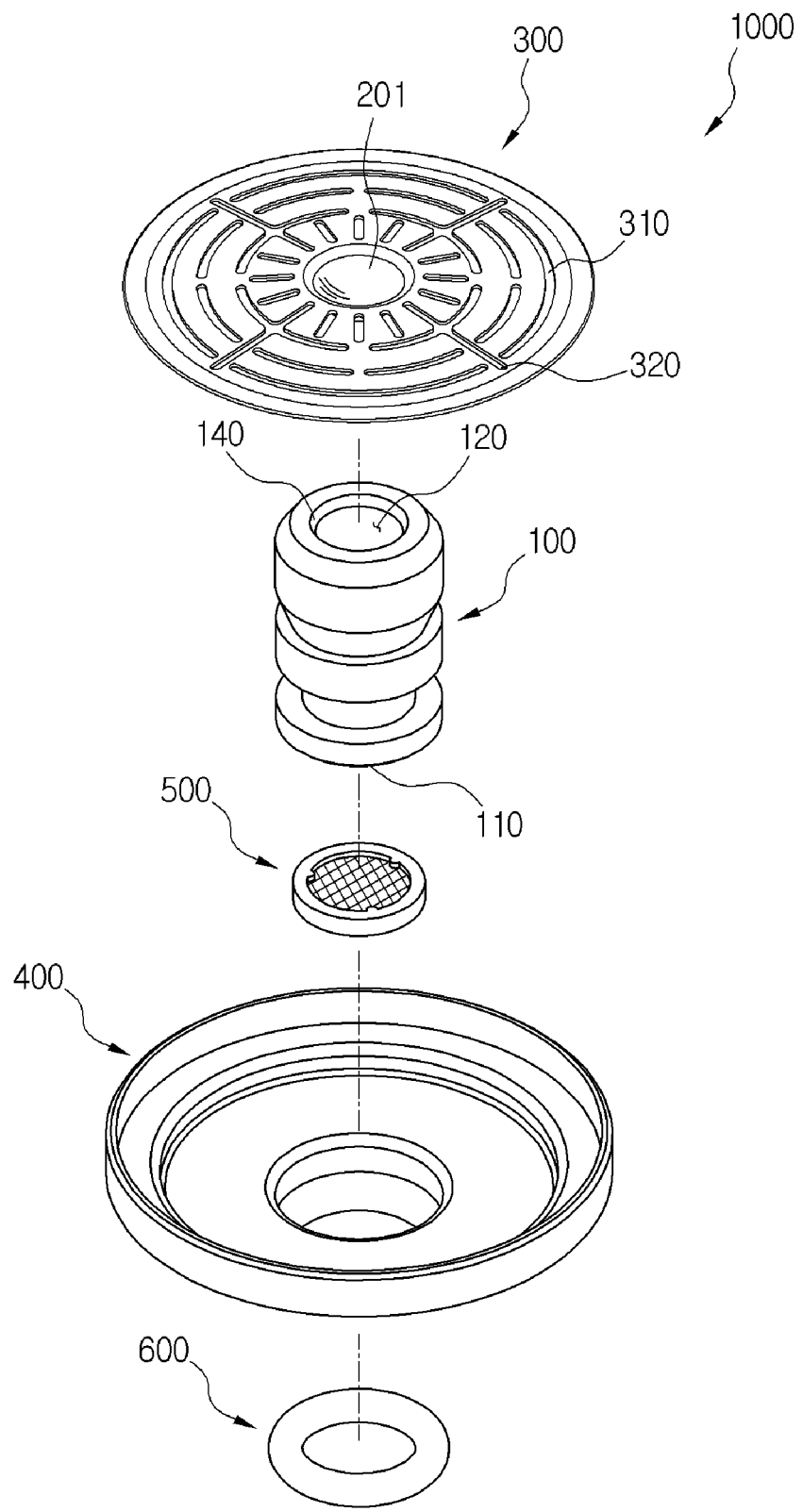
FIG. 7 is an exploded perspective view showing another fuel pressure controller according to the present invention.
Figure 8:
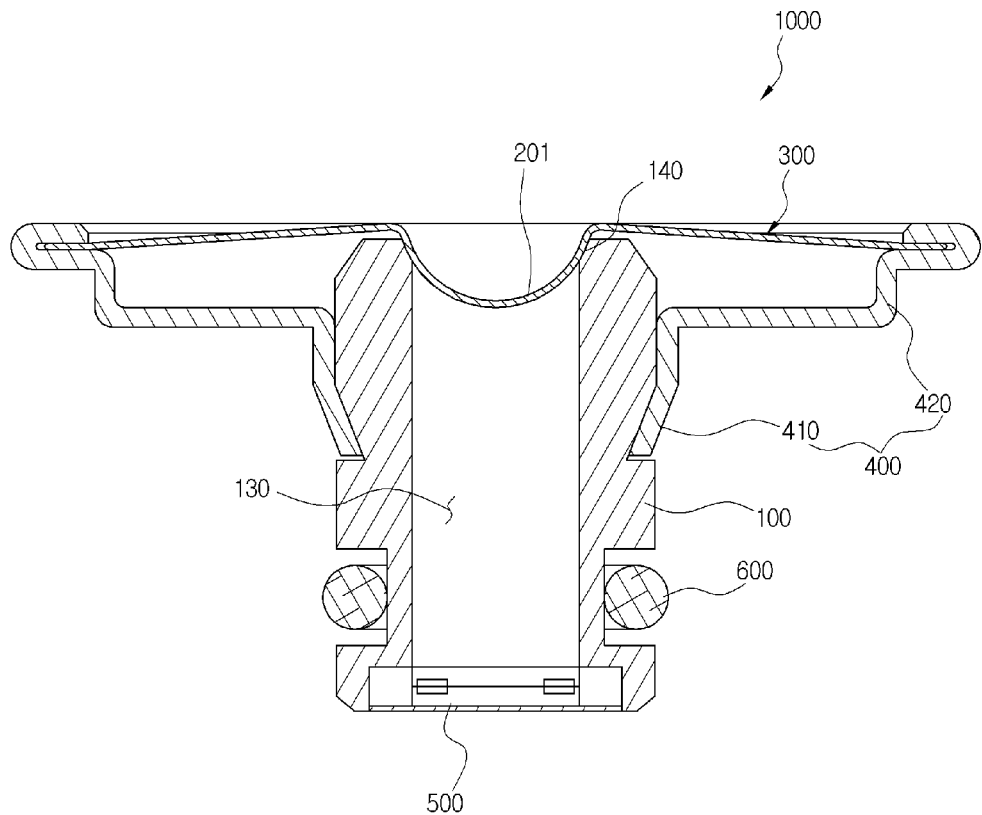
FIG. 8 is a cross-sectional view showing another fuel pressure controller according to the present invention.
Figure 9:
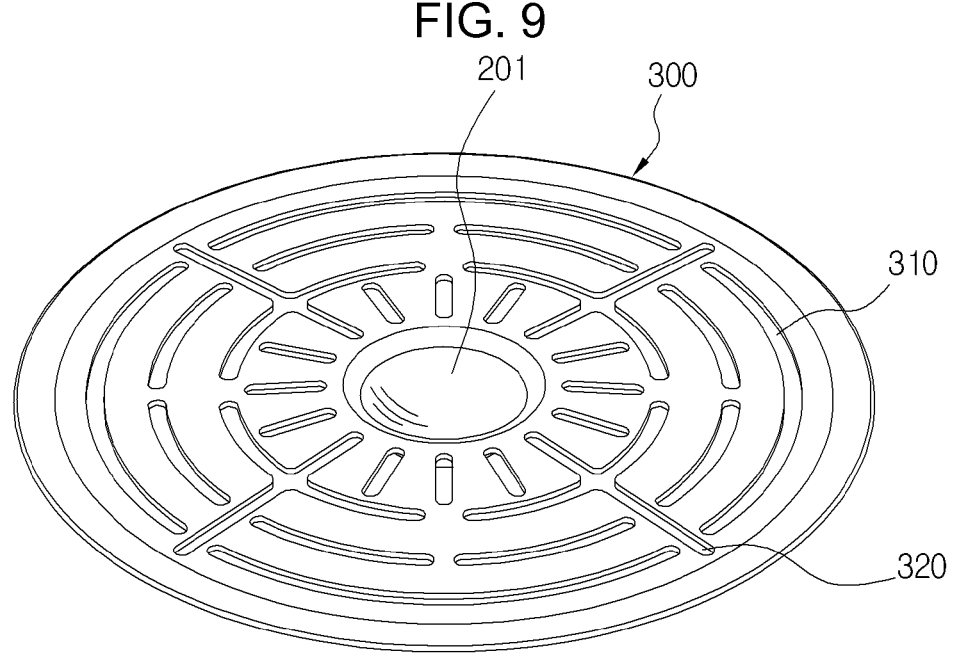
FIG. 9 is a perspective view showing another valve pressing member according to the present invention.

FIG. 1 is a cross-sectional view showing the fuel pressure controller according to the related art; FIG. 2 is a cross-sectional view showing another fuel pressure controller according to the related art; FIG. 3 is a perspective view showing the valve pressing member according to the related art; FIG. 4 is an exploded perspective view showing a fuel pressure controller according to the present invention; FIG. 5 is a cross-sectional view showing a fuel pressure controller according to the present invention; FIG. 6 is a perspective view showing the valve pressing member according to the present invention; FIG. 7 is an exploded perspective view showing another fuel pressure controller according to the present invention; FIG. 8 is a cross-sectional view showing another fuel pressure controller according to the present invention; FIG. 9 is a perspective view showing another valve pressing member according to the present invention; and FIGS. 10(*a*) to 10(*e*) are graphs showing measurement results of movement displacement of an open-close ball according to pressure applied by the valve pressing member according to the related art and a valve pressing member according to the present invention.

As shown in FIG. 4, a fuel pressure controller 1000 according to the present invention is mainly configured to include a valve 100, an open-close ball 200, a valve pressing member 300, and a housing 400.

The valve 100 includes an inlet port 110 and an outlet port 120, and is formed with a hollow part 130 of which an inner portion is hollow so as to control a flow of fuel, such that the inlet port 110 and the outlet port 120 are in communication with each other.

The outlet port 120 includes an open-close ball seat surface 140 formed at an end portion thereof, wherein the open-close ball seat surface 140 contacts the open-close ball 200 and is formed to be inclined inwardly so that the open-close balls 200 and 201 are seated thereon while closing the outlet port 120 in order to block the flow of the fuel to the outlet port 120.

Therefore, the open-close balls 200 and 201 are seated on the open-close ball seat surface 140 to thereby open or close the outlet port 120 according to pressure of the fuel.

The valve pressing member 300, which has a disk shape, presses the open-close balls 200 and 201 toward the outlet port 120, and includes first opening parts 310 formed to penetrate through upper and lower surfaces thereof so that a predetermined area thereof is opened in a circumferential direction and second opening parts 320 formed to penetrate through the upper and lower surfaces thereof so that a predetermined area thereof is opened in a radial direction.

The housing 400 receives the valve 100 and the valve pressing member 300 therein.

The housing 400 is configured to include a valve housing part 410 enclosing an outer circumferential surface of the valve 100 and fixing the valve 100 and a valve pressing member housing part 420 supporting a lower surface of the valve pressing member 300 so as to fix the valve pressing member 300 while receiving the valve pressing member 300 therein and enclosing an outer circumferential surface of the valve pressing member 300.

The housing 400 is welded or clamped to thereby be closely adhered to the valve pressing member 300 and the valve 100.

The inlet port 110 may include a fuel filter 500 formed in order to filter the fuel flowing through the valve 100.

The fuel filter 500 generally has a circular shape and is formed of a mesh shaped filter cloth.

In addition, the valve 100 may further include a sealing member 600 formed on a lower outer circumferential surface thereof adjacent to the inlet port 110.

The sealing member 600 is provided in order to increase airtight characteristics when the inlet port 110 of the fuel pressure controller 1000 according to the present invention is assembled with and connected to other components thereof.

Referring to FIGS. 4 and 5, the fuel transferred from a fuel pump through the inlet port 110 of the valve 100 is transferred to the fuel pressure controller 1000 according to the present invention.

The fuel passes through the fuel filter 500 and then flows in the hollow part 130 of the valve 100.

The fuel flowing in the hollow part 130 pushes the open-close balls 200 and 201 so as to be spaced apart from the open-close ball seat surface 140, thereby opening the outlet port 120. The fuel is discharged through a space spaced between the open-close balls 200 and 201 and the open-close ball seat surface 140.

When the fuel is discharged, the open-close balls 200 and 201 are pressed by pressure of the valve pressing member 300 so that they may return to the open-close ball seat surface 140 to thereby close the outlet port 120.

The valve pressing member 300 serves to control displacement by which the open-close balls 200 and 201 are spaced apart and lifted from the open-close ball seat surface 140 by the pressure of the fuel passing through the valve 100.

When the pressure of the fuel flowing in from the inlet port 110 of the valve 100 is larger than pressure applied to the open-close balls 200 and 201 by the valve pressing member 300, the open-close balls 200 and 201 are spaced apart from the open-close ball seat surface 140 to thereby move in an axial direction.

The fuel passes through the outlet port 120 of the valve 100 and is discharged through the first and second opening parts 310 and 320 until the pressure by the valve pressing member 300 becomes larger than the pressure of the fuel. When the pressure of the fuel is reduced, the open-close balls 200 and 201 close the outlet port 120 by the pressure of the valve pressing member 300.

As shown in FIGS. 5 and 6, the valve pressing member 300 includes an open-close ball insertion part 330 formed to be protruded in one side direction thereof, wherein the open-close ball insertion part 330 may include the open-close ball 200 forcedly inserted thereinto and fixed thereto.

Here, one side of the open-close ball 200 is seated on the open-close ball seat surface 140 formed on a cross section of the outlet port 120 of the valve 100, the other side thereof is inserted into the open-close ball insertion part 330 of the valve pressing member 300, an assembly of the valve 100, the open-close ball 200, and the valve pressing member 300 is received in the housing 400.

The open-close ball 200 has one side formed to have the same shape as that of a bottom surface of the open-close ball insertion part 330 so that the open-close ball 200 is seated on the bottom surface thereof while contacting the bottom surface thereof.

The open-close ball 200 is forcedly inserted into and fixed to the valve pressing member 300.

The open-close ball 200 may also be welded to the open-close ball insertion part 330 of the valve pressing member 300 to thereby be permanently attached thereto.

Meanwhile, as shown in FIGS. 7 to 9, the valve pressing member 300 may include a spherical body shaped open-close ball 201 formed integrally therewith at one side thereof and open or close the outlet port 120 of the valve 100 through the open-close ball 201.

After the valve pressing member 300 is seated on the open-close ball seat surface 140 formed on a cross section of the outlet port 120 of the valve 100 by the open-close ball 201 formed at one side thereof, the valve 100 and the valve pressing member 300 are received in the housing 400.

Therefore, the open-close ball 201 is formed integrally with the valve pressing member 300, such that a process of assembling the fuel pressure controller 1000 according to the present invention may be simplified and a cost may be reduced.

The first opening parts 310 of the valve pressing member 300 are formed to be opened at the same width in a circumferential direction, and the second opening parts 320 thereof are formed to be opened at the same width in a radial direction.

A plurality of first opening parts 310 are formed to be spaced apart from each other by predetermined intervals in the circumferential direction, and a plurality of second opening parts 320 are formed to be spaced apart from each other by predetermined intervals in the radial direction.

In addition, the first and second opening parts 310 and 320 may be formed so that predetermined areas thereof are in communication with each other.

As shown in FIGS. 6 and 9, the first opening parts 310 and the second opening parts 320 of the valve pressing member 300 may be formed to be symmetrical to each other based on the center of the valve pressing member 300, respectively.

As described above, the first opening parts 310 and the second opening parts 320 have regularity in that they are opened at the same width and are formed to be spaced apart from each other by the predetermined intervals, respectively. However, the number and the arrangement of first opening parts 310 and second opening parts 320 may be changed, as needed.

Figure 10A:
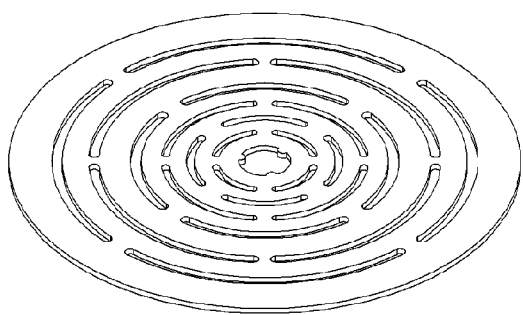
FIGS. 10A to 10E are graphs showing measurement results of movement displacement of an open-close ball according to pressure applied by the valve pressing member according to the related art and a valve pressing member according to the present invention.
Figure 10A:
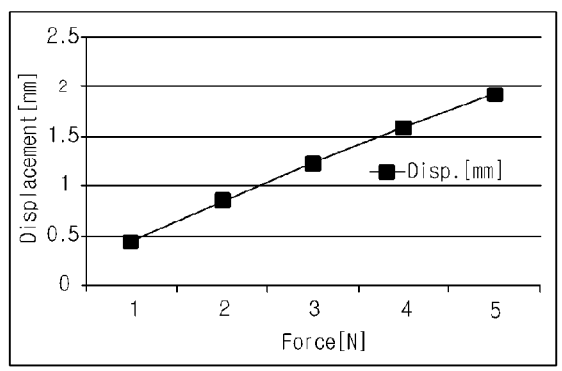
Figure 10B:
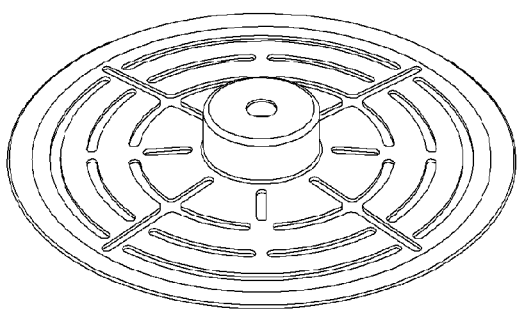
Figure 10B:
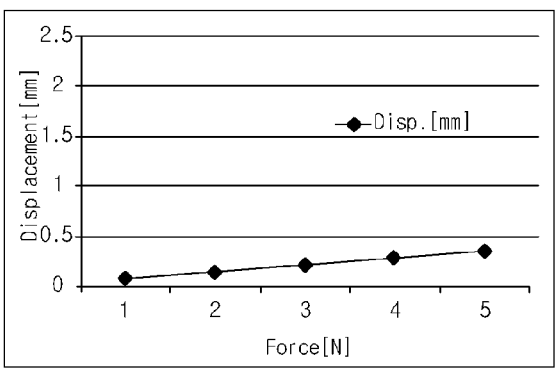
Figure 10C:
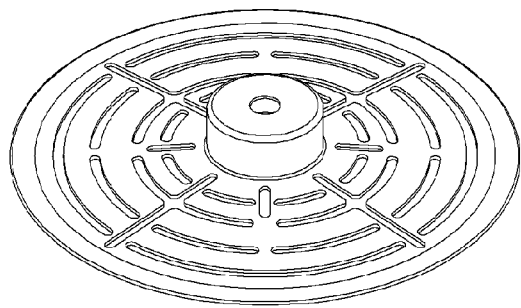
Figure 10C:
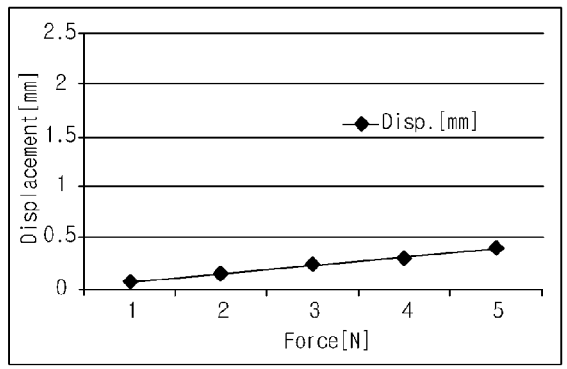
Figure 10D:
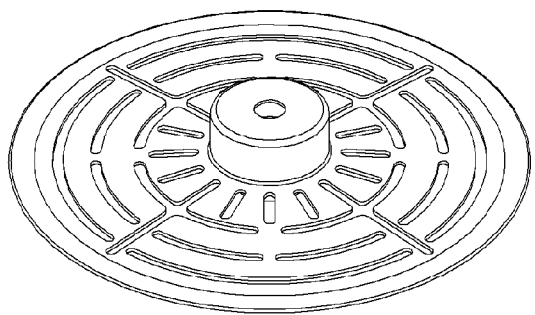
Figure 10D:
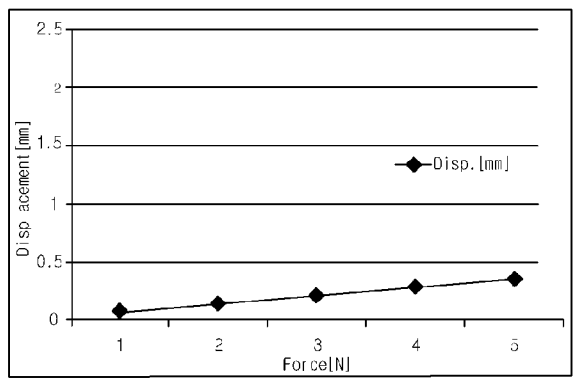
Figure 10E:
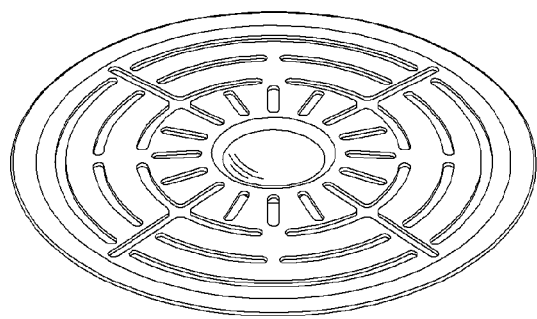
Figure 10E:
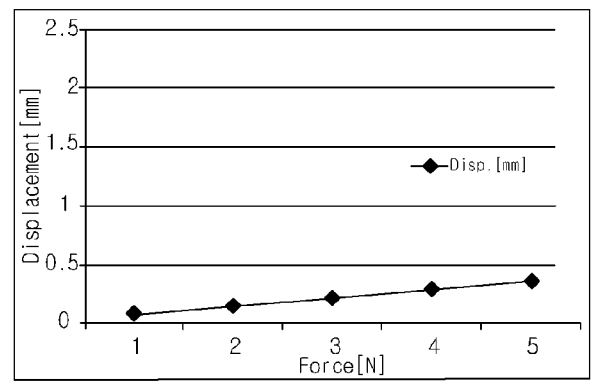

Measurement results of movement displacement of open-close balls 200 and 201 according to pressure applied to the open-close balls 200 and 201 by the valve pressing member 30 of the fuel pressure controller 1 according to the related art and the valve pressing member 300 according to the present invention are shown in graphs of FIGS. 10(a) to 10(b) in order to technically support the present invention.

Therefore, in the fuel pressure controller according to the present invention, the first and second opening parts each having the same width are formed in the valve pressing member in the circumferential direction and in the radial direction to generate displacement by which the open-close ball moves linearly according to applied pressure of the fuel and control the movement displacement of the open-close ball to be smaller than that of the open-close ball in the valve pressing member according to the related art, thereby making it possible to finely control pressure.

With the fuel pressure controller according to the present invention, the open-close ball insertion groove on which the open-close ball may be seated is formed in the valve pressing member included in the fuel pressure controller to prevent separation of the open-close ball at the time of an operation of the fuel pressure controller, thereby making it possible to accurately control pressure and reduce noise.

In addition, with the fuel pressure controller according to the present invention, the valve pressing member and the open-close ball are formed integrally with each other, such that the number of components of the fuel pressure controller is reduced, thereby making it possible to reduce a cost and simplify an assembly process.

Furthermore, with the fuel pressure controller according to the present invention, the opening parts each having the same width are formed in the valve pressing member in the circumferential direction and in the radial direction to generate displacement by which the open-close ball moves linearly according to applied pressure of the fuel and control the movement displacement of the open-close ball to be smaller than that of the open-close ball in the valve pressing member according to the related art, thereby making it possible to finely control pressure.

The present invention is not limited to the above-mentioned embodiments but may be variously applied, and may be variously modified without departing from the gist of the present invention claimed in the following claims.

What is claimed is:

1. A fuel pressure controller (1000) of a fuel supply device comprising:
   a valve (100) having a hollow part (130) formed therein and inlet and outlet ports (110 and 120) provided at both ends of the hollow part (130) to thereby control a flow of fuel, the hollow part (130) having the fuel flowing therethrough;
   an open-close ball (200) opening or closing the outlet port (120);
   a disk shaped valve pressing member (300) including first opening parts (310) formed to penetrate through upper and lower surfaces thereof so that a predetermined area thereof is opened in a circumferential direction and second opening parts (320) formed to penetrate through the upper and lower surfaces thereof so that a predetermined area thereof is opened in a radial direction, and an open-close ball insertion part (330) formed to be protruded in one side direction thereof, the open-close ball insertion part (330) including the open-close ball (200) forcedly inserted thereinto and fixed thereto, and pressing the open-close ball (200) toward the outlet port (120); and
   a housing (400) receiving the valve (100) and the valve pressing member (300) therein.

2. The fuel pressure controller of claim 1, wherein the open-close ball (200) has one side formed to have the same shape as that of a bottom surface of the open-close ball insertion part (330) so that it is seated on the bottom surface thereof while contacting the bottom surface thereof.

3. The fuel pressure controller of claims 1, wherein the first opening parts (310) are formed to be spaced apart from each other by predetermined intervals in the circumferential direction, and the second opening parts (320) are formed to be spaced apart from each other by predetermined intervals in the radial direction.

4. The fuel pressure controller of claim 3, wherein the first and second opening parts (310 and 320) of the valve pressing member (300) are formed so that predetermined areas thereof are in communication with each other.

5. The fuel pressure controller of claim 4, wherein the outlet port (120) includes an open-close ball seat surface (140) formed at an end portion thereof, the open-close ball seat surface (140) contacting the open-close ball (200) being formed to be inclined inwardly so that the open-close balls (200) are seated on the end portion of the outlet port (120) while sealing the outlet port (120) in order to block a flow of the fuel to the outlet port (120).

6. The fuel pressure controller of claim 5, wherein the housing (400) includes:
   a valve housing part (410) enclosing an outer circumferential surface of the valve (100) and fixing the valve (100); and
   a valve pressing member housing part (420) supporting a lower surface of the valve pressing member (300) so as to fix the valve pressing member (300) while receiving the valve pressing member (300) therein and enclosing an outer circumferential surface of the valve pressing member (300).

7. The fuel pressure controller of claim 6, wherein the housing (400) is welded or clamped and is adhered to the valve pressing member (300) and the valve (100) to thereby be closely fixed thereto.

8. The fuel pressure controller of claim 7, wherein the valve (100) includes a sealing member (600) formed on a lower outer circumferential surface thereof.

9. The fuel pressure controller of claim 8, wherein the inlet port (110) further includes a fuel filter (500) formed in order to filter the fuel flowing through the valve (100).

* * * * *